(12) United States Patent  (10) Patent No.: US 9,203,454 B2
Sharpe et al.  (45) Date of Patent: Dec. 1, 2015

(54) FM RECEIVER NOISE REDUCTION (75) Inventors: Jacob Sharpe, Cambridge (GB); Andrei Popescu, Cambridge (GB)

(73) Assignee: QUALCOMM Technologies International, LTD., Cambridge (GB)

(*) Notice: Subject to any disclaimer, the term of this patent is extended or adjusted under 35 U.S.C. 154(b) by 479 days.

(21) Appl. No.: 13/510,571

(22) PCT Filed: Nov. 16, 2010

(86) PCT No.: PCT/EP2010/067554
§ 371 (c)(1),
(2), (4) Date: May 17, 2012

(87) PCT Pub. No.: WO2011/061177
PCT Pub. Date: May 26, 2011

(65) Prior Publication Data
US 2012/0224699 A1 Sep. 6, 2012

(30) Foreign Application Priority Data
Nov. 17, 2009 (GB) .................. 0920093.2

(51) Int. Cl.
H04B 1/16 (2006.01)
H04B 1/3805 (2015.01)
H04B 15/06 (2006.01)

(52) U.S. Cl.
CPC ............ *H04B 1/1676* (2013.01); *H04B 1/3805* (2013.01); *H04B 15/06* (2013.01)

(58) Field of Classification Search
CPC ...................................... H04B 1/1661–1/1684
USPC ..................................................... 381/2, 3, 13
See application file for complete search history.

(56) References Cited

U.S. PATENT DOCUMENTS

| 5,253,299 | A | 10/1993 | Ishida et al. |
| 6,823,071 | B2 * | 11/2004 | Yamamoto ........................ 381/2 |
| 7,106,246 | B1 * | 9/2006 | Lindell ............................ 342/51 |
| 2004/0176057 | A1 * | 9/2004 | Miyagi .......................... 455/142 |
| 2007/0297622 | A1 | 12/2007 | Saito et al. |

FOREIGN PATENT DOCUMENTS

| CN | 101098152 A | 1/2008 |
| EP | 0418036 A2 | 3/1991 |

(Continued)

OTHER PUBLICATIONS

International Search Report and Written Opinion mailed Feb. 23, 2011 for PCT Application No. PCT/EP2010/067554.

(Continued)

*Primary Examiner* — Sonia Gay
(74) *Attorney, Agent, or Firm* — The Marbury Law Group, PLLC (57) ABSTRACT

Apparatus to reduce noise in a stereo FM broadcast received via an antenna, the apparatus comprising: a frequency translator configured to translate the received stereo FM broadcast to an intermediate carrier frequency, a demodulation unit configured to demodulate the translated FM signal so as to form left-plus-right and left-minus-right AM signals, a filter configured to form a filtered signal by filtering one of the AM signals, so as to suppress a sub-band of that signal containing unwanted tones, a summing unit for summing the filtered signal and the other of the left-plus-right and left-minus-right signals to produce a stereo audio signal.

9 Claims, 7 Drawing Sheets

(56) References Cited

FOREIGN PATENT DOCUMENTS

| | | |
|---|---|---|
| JP | 58187100 A | 11/1983 |
| WO | WO 2007083107 A1 * | 7/2007 |

OTHER PUBLICATIONS

Office Action issued for Chinese Patent Application No. 201080051853.8., dated Nov. 3, 2014, 21 pages with English language translation.

* cited by examiner

FM RECEIVER NOISE REDUCTION

The present invention relates to techniques for reducing noise introduced to a FM demodulator from a local oscillator signal generator.

More specifically, an aspect of the invention relates to a method and apparatus for removing an audible tone that may be present in the audio signal produced by an FM receiver, when the receiver LO has reference spurs, typically at the PLL reference frequency.

BACKGROUND

Despite the rise of digital radio, FM radio receivers are still very popular and are increasingly seen in mobile telephones and other electronic handheld devices such as MP3 players. The introduction of FM radio receivers into such devices has introduced a new set of noise problems which had not previously been a priority for FM designers, particularly with respect to stereo FM broadcasts, which is the dominant format used today.

In order to ensure that stereo broadcasts are compatible with mono receivers having just one speaker, stereo FM is encoded in a manner that allows a mono receiver to easily extract a channel which contains a mix of the left and right stereo channels. Stereo FM is encoded using two channels, one being the sum of the left and right stereo channels (L+R) and the other being the difference of the left and right channels (L−R). A mono receiver uses just the L+R channel for playback. A stereo receiver can add the L+R and L−R channels to obtain the left channel and subtract the L−R signal from the L+R signal to obtain the right channel.

Figure 1:
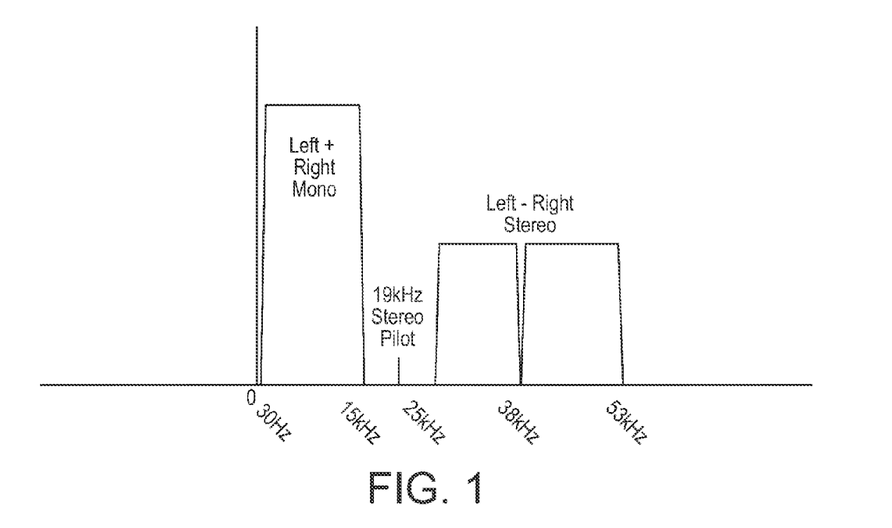
FIG. 1 shows the demodulated L+R, L−R and pilot tone channels of an FM broadcast.

As shown in FIG. 1, when suitably demodulated, the main L+R channel occupies a frequency range of 30 Hz to 15 kHz. Sub-channel L−R is a double-sideband suppressed carrier (DSBSC) signal using the baseband range of 23 kHz to 53 kHz. A pilot tone is also present at 19 kHz and is used to allow the sub carrier to be demodulated with the correct phase. At the FM transmitter, a composite signal of the main channel, sub-channel and pilot tone can be used to modulate the carrier.

Figure 2:
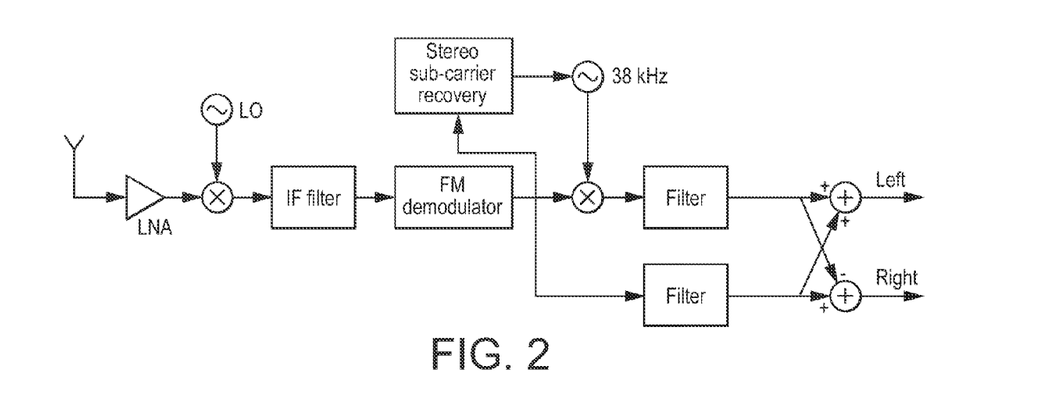
FIG. 2 shows a typical FM receiver arrangement known in the art.

FIG. 2 shows a typical FM receiver arrangement. The FM signal is received from the FM transmitter via the antenna, amplified using a low noise amplifier (LNA) and then mixed with a local oscillator (LO) signal. The LO signal is generated using a phase locked loop (PLL). The LO signal is used to down convert the received signal. The down-conversion processes the received signal to create an intermediate frequency (IF) signal where the frequency spectrum of the wanted signal component is located at frequencies that are convenient for further processing. The IF signal is then filtered to remove unwanted noise, before it is demodulated by an FM demodulator. The resulting signal is then filtered to produce a separate L+R channel. The L−R channel is generated by translating the stereo sub-carrier to base-band, whereby its spectrum is 'shifted' in frequency by 38 kHz. This shift is performed by mixing the stereo sub-carrier with a 38 kHz signal using a mixing circuit.

The individual left and right channels are then generated by summing the L+R and L−R channels as described above. E.g. The L+R and L−R channels are summed to obtain the left channel and the L−R signal is subtracted from the L+R signal to obtain the right channel.

One problem with this system is a type of noise resulting from PLL 'reference spurs'. The signal generated by a PLL usually has a number of spurious noise levels. The specification of a RF system making use of a PLL usually takes this into account. These spurious noise levels may occur for several different reasons. A 'reference spur' is so named as it results from feedthrough from the reference signal used by the PLL. The spurs are caused by imperfections in the PLL components, such as a mismatched propagation delay in the phase frequency detector, mismatches in the charge injection and current, and leakage current in the VCO tuning node. Consequently, as the PLL is unable to generate an output signal perfectly in phase with the reference signal, an oscillation of the phase of the generated signal occurs as the VCO continually corrects to bring the generated back or forward to match the reference signal. This oscillation has a frequency matching the reference frequency. Therefore, the resulting signal generated by the PLL has, not only an AM modulated component, but an FM modulated component.

Therefore, the reference spur is a sinusoidal phase modulation of the local oscillator signal at the frequency of F_ref (the reference frequency used for the PLL clock). In the FM receiver described above, when the received FM signal is mixed with the LO signal featuring the reference spur, a sinusoidal phase modulated noise signal at a frequency of F_ref is included in the resulting signal. When this signal is FM demodulated, a noise signal at frequency F_ref results. Where F_ref is within the band occupied by either the stereo main channel or sub-channel, this can result in audible noise in the fully demodulated FM stereo signal.

Figure 3:
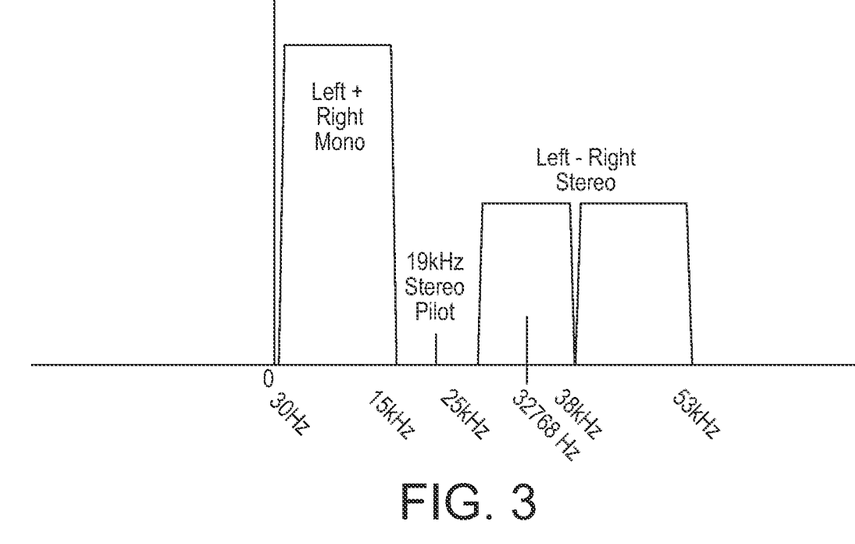
FIG. 3 shows the demodulated FM broadcast of FIG. 1 with a noise component at 32768 Hz.

FIG. 3 shows an example of the reference spur noise problem described above. Many mobile phones currently include FM stereo broadcast receivers and supply to them a clock with a frequency of 32768 Hz. This clock frequency is commonly used in mobile phone architectures. Where the FM receiver incorporates a PLL that generates an LO signal for down-conversion, it is often convenient to use the 32768 Hz clock as a reference signal for the PLL. A 32768 Hz clock used as a reference signal for the PLL can create a 32768 Hz LO spur, resulting in a sinusoid of 32768 Hz being added to the stereo multiplex signal recovered in the receiver through FM demodulation. This unwanted 32768 Hz sinusoid lies within the 23 kHz-53 kHz band occupied by the stereo sub-carrier. The signal processing in the receiver includes translating the stereo sub-carrier to base-band, whereby its spectrum is 'shifted' in frequency by 38 kHz to produce the L−R signal. Once the FM signal has been fully demodulated, the unwanted sinusoid appears in the L−R signal at a frequency of 38000 Hz−32768 Hz=5232 Hz. The L−R signal is subsequently added to the L+R signal to produce stereo audio consisting of 'left' and 'right' signals. Hence the unwanted sinusoid is audible in the left and right channels at 5232 Hz.

Previous approaches to addressing this problem have involved refining the design of the voltage controlled oscillator (VCO) in the PLL to minimise the size of the reference spurs and so reduce the spurious audio noise. These techniques can require a great precision in the manufacture of the components and result in a higher per-unit cost.

What is needed is a method of reducing or eliminating the noise resulting from the reference spurs without the use of more expensive components.

According to a first aspect of the present invention there is provided an apparatus to reduce noise in a stereo FM broadcast received via an antenna, the apparatus comprising: a frequency translator configured to translate the received stereo FM broadcast to an intermediate carrier frequency, a demodulation unit configured to demodulate the translated FM signal so as to form left-plus-right and left-minus-right AM signals, a filter configured to form a filtered signal by filtering one of the AM signals, so as to suppress a sub-band of that signal containing unwanted tones, a summing unit for summing the filtered signal and the other of the left-plus-right and left-minus-right signals to produce a stereo audio signal.

According to a second aspect of the invention, there is provided a method of filtering noise from a stereo FM signal, the method comprising the steps of: demodulating an FM stereo broadcast signal into the left-plus-right and left-minus-right AM signals, filtering one of the AM signals, so as to suppress a sub-band of that signal containing unwanted tones, summing the filtered signal and the other of the left-plus-right and left-minus-right signals in such a manner as to produce a stereo audio signal.

Aspects of the present invention will now be described by way of example with reference to the accompanying drawing. In the drawings.

DESCRIPTION OF THE INVENTION

Figure 4:
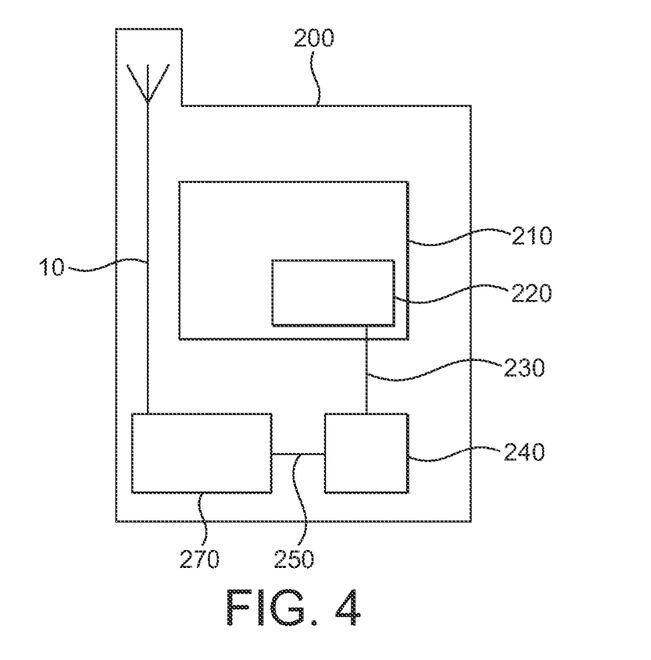
FIG. 4 shows an embodiment of the invention incorporated into a handheld device.

As shown in FIG. 4, an aspect of the invention provides a mobile handset 200 having a subsystem 210. Subsystem 210 includes reference frequency source 220 providing a reference signal 230 having a reference frequency. Reference signal 230 is used by Local Oscillator (LO) generator 240 to generate LO signal 250. LO signal 250 is then used by FM demodulator 270 to translate an FM broadcast received using antenna 10 to an intermediate frequency for further processing by FM demodulator 270.

Figure 5:
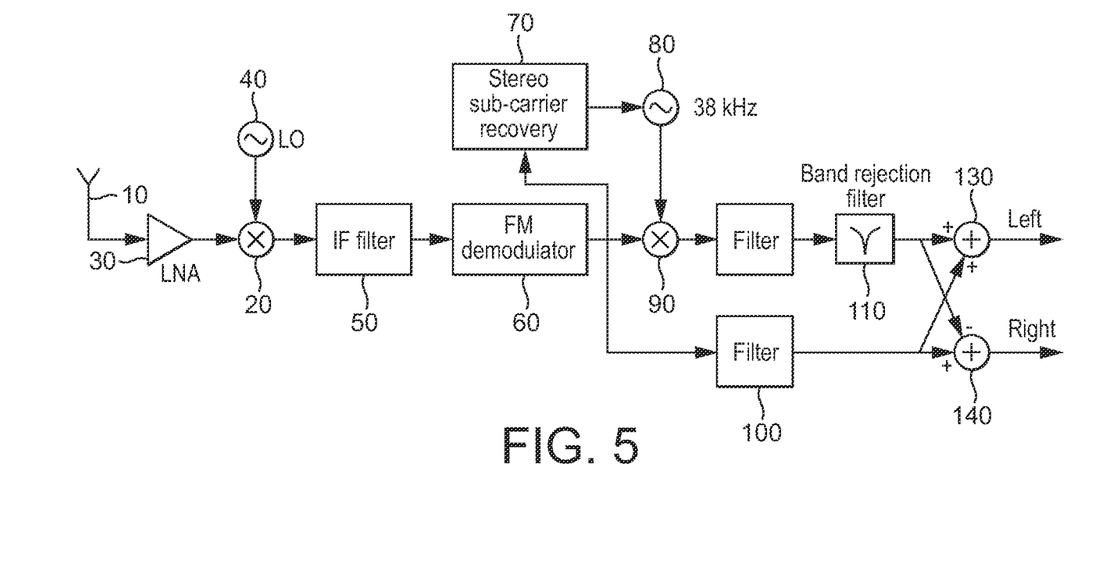
FIG. 5 shows an embodiment of the invention having a band bass filter applied to the L−R channel.

FIG. 5 shows an antenna 10 for receiving the FM broadcast. The received signal is then amplified using low noise amplifier 30. Local oscillator 40 comprises a phase locked loop (PLL) signal generator using reference frequency of reference signal 230 to generate a LO signal. The received and amplified FM signal is mixed with the LO signal to translate the received signal to an intermediate frequency (IF) more suitable for processing. IF filter 50 then filters unwanted noise from the IF signal. FM demodulator demodulates the FM IF signal and generates the full composite signal spectrum. A 38 kHz tone coherent with the stereo subcarrier is produced by sub-carrier recovery module 70 and mixed with the received stereo multiplex signal using mixer 80 to translate the stereo sub-carrier to baseband. The L−R and L+R channels are then individually filtered to remove unwanted noise. In this preferred embodiment of the invention, the L−R signal is then filtered to reject a very narrow frequency band centred on the frequency of the unwanted tone, introduced by the PLL. The L−R signal is subsequently added to the L+R signal using summing devices 130 and 140 to produce stereo audio consisting of 'left' and 'right' signals.

In an example in which a 32768 Hz reference frequency is used, a 32768 Hz noise signal occurs in the demodulated full composite signal. Once this has been mixed down by 38 kHz, the resulting noise signal is centred around 5232 Hz. In a preferred embodiment of the invention, band rejection filter 110 filters out frequencies around 5232 Hz In one embodiment of the invention, filter 110 is a 'notch' filter. Such a filter may be implemented as follows:

Let $$c_z = e^{\frac{j2\pi 5232}{Fs}}$$

and $c_p = pc_z$ with conventional notation $j = \sqrt{-1}$. Then the z-transform of a notch filter centred on 5232 Hz is $$H(z) = \frac{(1 - c_z z^{-1})(1 - c_z^* z^{-1})}{(1 - c_p z^{-1})(1 - c_p^* z^{-1})}. \qquad (1)$$

Figure 9:
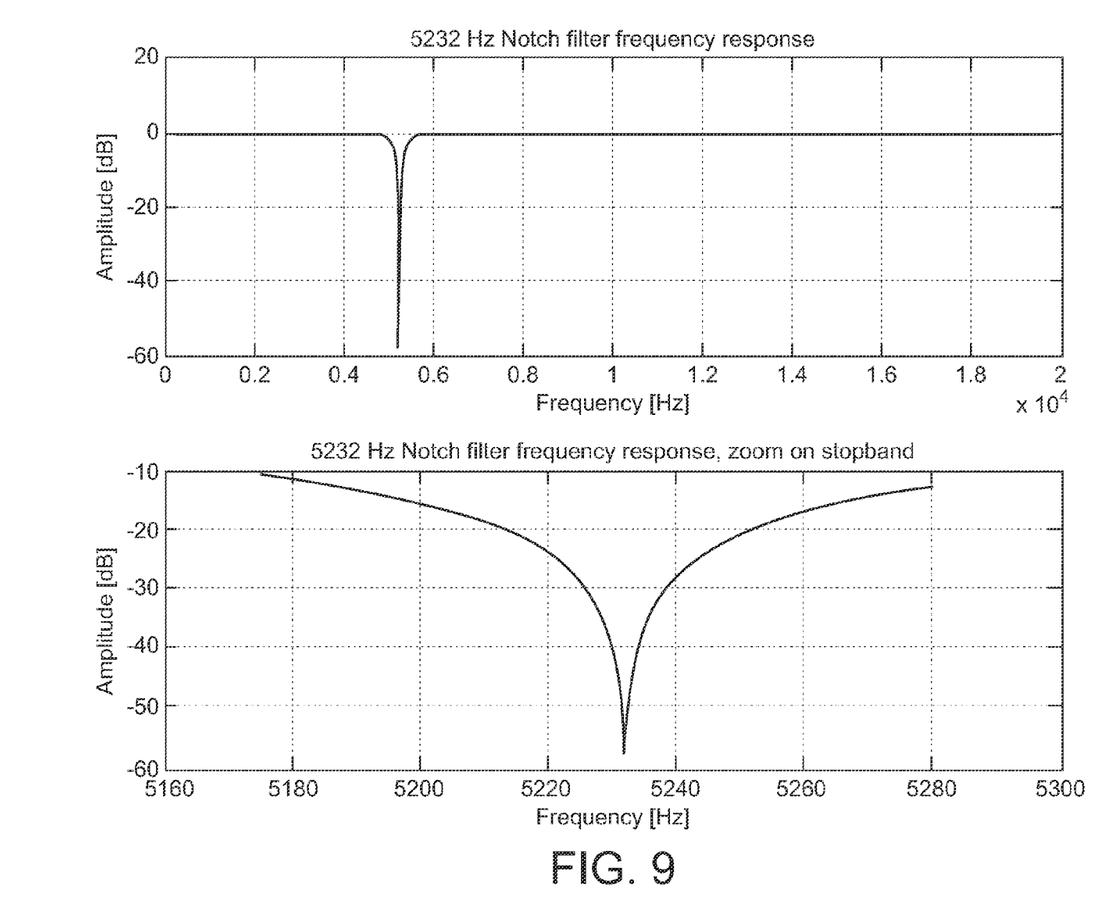
FIG. 9 shows an example of a notch filter frequency response at 5232 Hz.

The frequency response of this filter, for p=0.985 and Fs=80 kHz is illustrated in FIG. 9.

Figure 10:
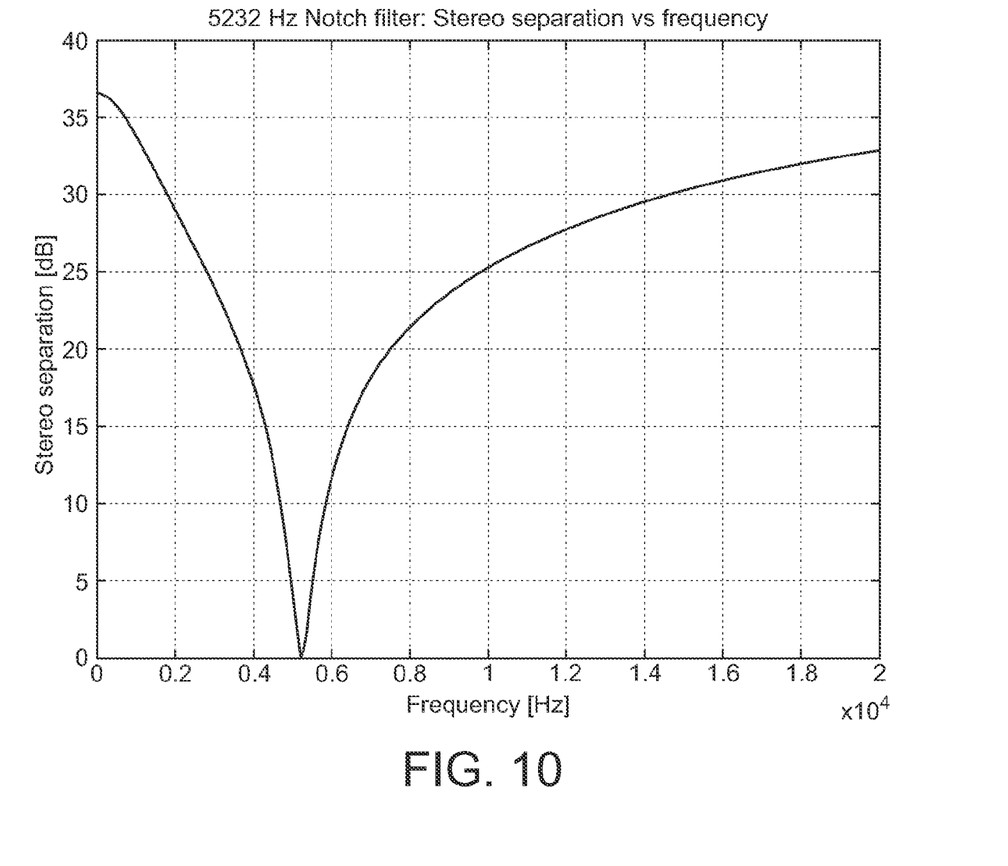
FIG. 10 shows the stereo separation of the output signal around the frequencies effected by the notch filter.

The L−R signal is subsequently added to the L+R signal which preserves the frequencies around 5232 Hz, producing stereo audio consisting of 'left' and 'right' signals, having the full range of demodulated frequencies and only lacking some of the stereo information around 5232 Hz. Because the notch filter alters the amplitude and phase of the wanted L−R signal component as well as removing the noise signal at 5232 Hz, the stereo separation is degraded at some frequencies. This is illustrated in FIG. 10, for the filter described in equation (1) and FIG. 9. Although the unwanted tone may be rejected by filtering the stereo multiplex signal, this is less effective than the techniques used in the present invention. In this embodiment of the invention, the L+R signal is unaffected and so the distortion to the audio output is minimised. The methodology is also appropriate to reject unwanted sinusoidal components added to the wanted signal as a result of LO imperfections other than reference spurs. The bandwidth and (in a discrete-time representation) the sampling frequency of the L−R signal in a typical receiver are lower than the bandwidth and sampling frequency of the stereo multiplex signal. This normally results in a lower complexity for the filtering operation if it is applied to the L−R signal, compared with an equivalent filtering operation applied to the stereo multiplex signal. As shown in FIG. 10, the effect of rejecting the noise signal component at 5232 Hz from the L−R signal is that stereo separation is reduced in a narrow band centred on 5232 Hz. This will result in a practically imperceptible loss in quality of the received FM signal.

Figure 6:
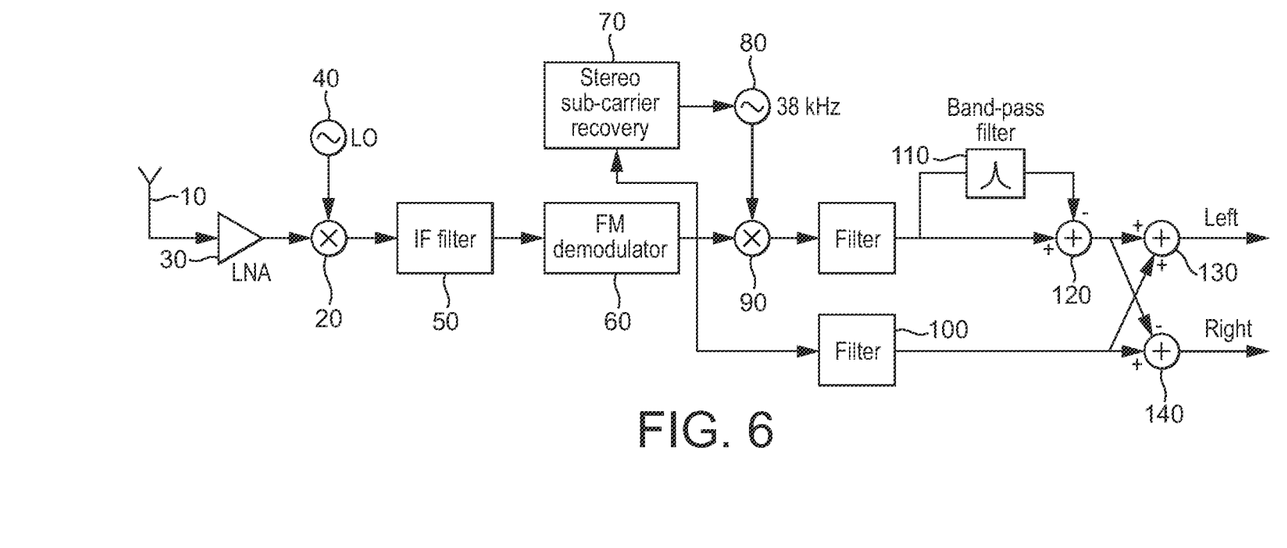
FIG. 6 shows another embodiment of the invention wherein the unwanted tone is filtered and then subtracted from the L−R channel.

FIG. 6 shows another embodiment of the present invention. In this embodiment, the narrow band rejection filter to filter the unwanted noise introduced by the PLL reference spurs may be implemented using a narrow band-pass filter 110 and a subtraction circuit 120.

Figure 7:
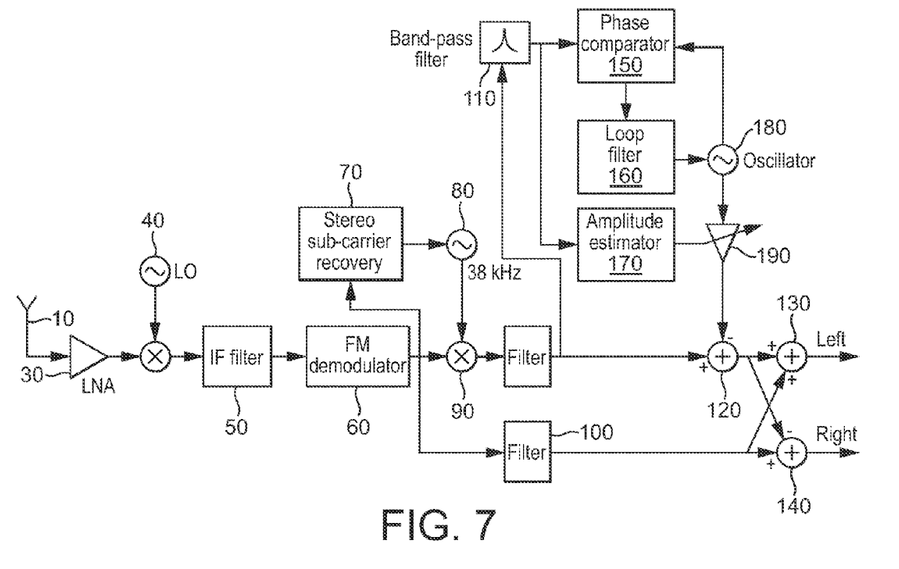
FIG. 7 shows another embodiment of the invention wherein the unwanted tone is synthesised and then subtracted from the L−R channel.

In an embodiment shown in FIG. 7, the unwanted tone may be removed using a tone estimation and subtraction technique. This may be implemented using a PLL comprising phase comparator 150, loop filter 160 and oscillator 180. The L+R signal is passed through a band-pass filter resulting in a signal mostly comprising just the noise tone. The PLL is used to determine the phase of the unwanted tone, while amplitude estimator 170 is used to estimate the amplitude of the unwanted tone. The sinusoid generated by oscillator 180 is amplified by amplifier 190 according to the estimation produced by amplitude estimator 170. Summing device 120 is used to subtract the amplified sinusoid from the L−R signal, resulting in a L−R signal missing the unwanted tone. Rejection of the unwanted sinusoid using this scheme alters the wanted signal component by less as compared with the preferred scheme using the notch filter. Therefore the stereo separation performance is preserved. However, this implementation has a higher implementation complexity.

Figure 8:
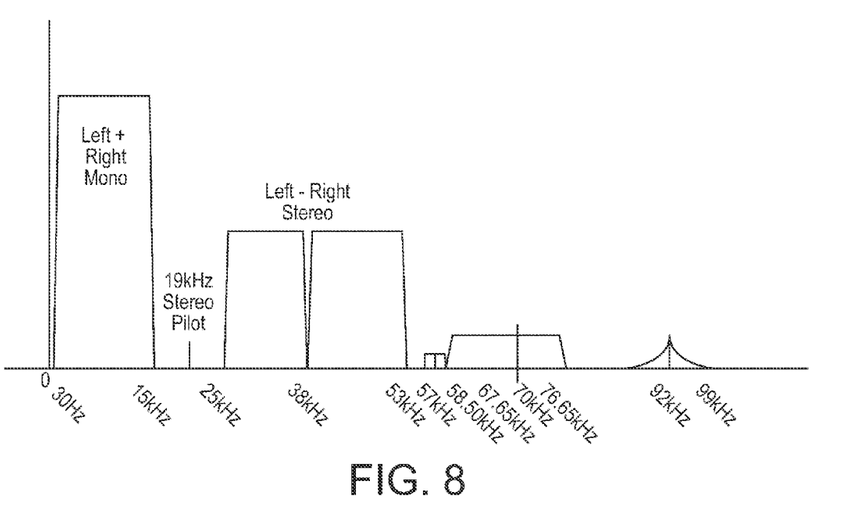
FIG. 8 shows the demodulated FM broadcast of FIG. 1 with a unwanted noise tone residing in a band occupied by a component of the stereo multiplex signal other than the stereo sub-carrier.

It is conceivable that in some FM receiver implementations, the LO reference frequency is such that the unwanted noise tone resides in a band occupied by a component of the stereo multiplex signal other than the stereo sub-carrier. An example of this scenario is shown in FIG. 8, where the unwanted tone appears at 70 kHz. In such a case, an embodiment of the present invention provides that the unwanted tone may be rejected by filtering according to the aforementioned techniques. The unwanted tone may be rejected from the signal obtained after the effected sub-carrier is separated from the stereo multiplex.

Embodiments of the present invention may be used with any device incorporating an FM receiver and where—due to interference or analogue circuit imperfections—an unwanted sinusoid is present in the stereo multiplex signal at a frequency within the band occupied by a desired sub-carrier. Examples may include portable media players, satellite navigation devices and car radios, incorporating an FM receiver.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. Apparatus to reduce unwanted signal tones in a stereo frequency-modulation (FM) broadcast received via an antenna, the apparatus comprising:
   a frequency translator configured to translate the received stereo FM broadcast to an intermediate carrier frequency,
   a demodulation unit configured to demodulate the translated FM signal so as to form left-plus-right and left-minus-right amplitude-modulation (AM) signals,
   a filter configured to form a filtered signal by filtering one of the left-plus-right or left-minus-right AM signals to reject a narrow frequency band centered on a frequency of an unwanted tone, so as to suppress a sub-band of the left-plus-right or left-minus-right signal containing the unwanted tone,
   a summing unit for summing the filtered signal and the other of the left-plus-right and left-minus-right signals to produce a stereo audio signal.

2. The apparatus of claim 1, wherein the frequency translator comprises:
   a mixing circuit, and
   an oscillator configured to operate in dependence on a reference signal and generate an oscillator signal,
   the frequency translator being configured such that, when mixed with the oscillator signal, the received stereo FM broadcast is translated to the intermediate frequency,
   wherein the unwanted tone are is correspondent to the frequency of the reference signal.

3. The apparatus of claim 2, wherein the reference signal is generated by a host device.

4. The apparatus of claim 2, wherein the reference signal has a frequency of 32768 Hz and the filter is configured to remove the unwanted tone from the left-minus-right signal.

5. The apparatus of claim 1, wherein the filter is a notch filter.

6. The apparatus of claim 1, wherein the filter is a narrow band rejection filter comprising:
   a narrow band-pass filter configured to receive as input the AM signal containing the unwanted tone and pass through just the frequencies of the sub-band,
   the narrow band rejection being configured to output the AM signal minus the passed through frequencies of the sub-band.

7. The apparatus of claim 1, wherein the filter is a tone estimation and subtraction filter comprising:
   a narrow band-pass filter configured to receive as input the AM signal containing the unwanted tone and pass through just the frequencies of the sub-band,
   a PLL signal generator configured to determine the phase and dominant frequency of the passed through frequencies and generate a corresponding signal,
   an amplitude estimator configured to estimate the amplitude of the passed through frequencies and amplify the generated signal to match the estimated amplitude,
   a subtraction circuit configured to subtract the amplified generated signal from the AM signal.

8. A handheld communications device, comprising:
   the apparatus of claim 1; and
   a reference frequency generator configured to generate the reference signal.

9. A method of filtering unwanted signal tones from a stereo frequency-modulation (FM) signal, the method comprising the steps of:
   demodulating an FM stereo broadcast signal into the left-plus-right and left-minus-right amplitude-modulation (AM) signals,
   filtering one of the left-plus-right or left-minus-right AM signals to reject a narrow frequency band centered on a frequency of an unwanted tone, so as to suppress a sub-band of the left-plus-right or left-minus-right signal containing the unwanted tone,
   summing the filtered signal and the other of the left-plus-right and left-minus-right signals in such a manner as to produce a stereo audio signal.

* * * * *